US008452660B2

(12) United States Patent  (10) Patent No.: US 8,452,660 B2
Morris  (45) Date of Patent: May 28, 2013

(54) SELF-CHECKOUT SECURITY SYSTEM AND METHOD THEREFOR

(75) Inventor: Charles Morris, Beaconsfield (CA)

(73) Assignee: Fujitsu Frontech North America Inc., Foothill Ranch, CA (US)

( * ) Notice: Subject to any disclaimer, the term of this patent is extended or adjusted under 35 U.S.C. 154(b) by 547 days.

(21) Appl. No.: 11/447,304

(22) Filed: Jun. 6, 2006

(65) Prior Publication Data

US 2008/0005036 A1  Jan. 3, 2008

(51) Int. Cl.
*G06Q 20/00* (2012.01)
*G06G 1/12* (2006.01)
*G06K 15/00* (2006.01)

(52) U.S. Cl.
USPC .............. 705/16; 705/20; 705/21; 705/23; 705/64; 235/383

(58) Field of Classification Search
None
See application file for complete search history.

(56) References Cited

U.S. PATENT DOCUMENTS

| | | | | |
|---|---|---|---|---|
| 4,779,706 A * | 10/1988 | Mergenthaler | | 186/61 |
| 5,083,638 A * | 1/1992 | Schneider | | 186/61 |
| 5,115,888 A * | 5/1992 | Schneider | | 186/61 |
| 5,123,494 A * | 6/1992 | Schneider | | 177/50 |
| 5,168,961 A * | 12/1992 | Schneider | | 186/52 |
| 5,239,167 A * | 8/1993 | Kipp | | 235/383 |
| 5,250,789 A * | 10/1993 | Johnsen | | 705/14.23 |
| 5,393,965 A * | 2/1995 | Bravman et al. | | 235/383 |
| 5,424,524 A * | 6/1995 | Ruppert et al. | | 705/17 |
| 5,494,136 A * | 2/1996 | Humble | | 186/61 |
| 5,497,853 A * | 3/1996 | Collins et al. | | 186/61 |
| 5,540,301 A * | 7/1996 | Dumont | | 186/61 |
| 5,635,906 A * | 6/1997 | Joseph | | 340/572.3 |
| 5,649,114 A * | 7/1997 | Deaton et al. | | 705/14.35 |
| 5,804,807 A * | 9/1998 | Murrah et al. | | 235/383 |
| 5,825,002 A * | 10/1998 | Roslak | | 235/375 |
| 5,855,007 A * | 12/1998 | Jovicic et al. | | 705/14.26 |
| 5,877,485 A | 3/1999 | Swartz | | |
| 5,884,281 A * | 3/1999 | Smith et al. | | 705/26.8 |
| 5,952,642 A | 9/1999 | Lutz | | |
| 5,978,772 A * | 11/1999 | Mold | | 705/16 |
| 5,979,758 A * | 11/1999 | Swartz et al. | | 235/383 |
| 6,145,629 A | 11/2000 | Addy | | |
| 6,189,789 B1 * | 2/2001 | Levine et al. | | 235/383 |
| 6,204,763 B1 * | 3/2001 | Sone | | 340/568.1 |
| 6,215,078 B1 | 4/2001 | Torres | | |
| 6,547,040 B2 * | 4/2003 | Goodwin, III | | 186/61 |
| 6,694,221 B2 * | 2/2004 | Chavez et al. | | 700/236 |
| 7,085,677 B1 * | 8/2006 | Champlin et al. | | 702/182 |
| 7,255,003 B2 * | 8/2007 | Schneiter | | 73/296 |
| 2003/0126019 A1 * | 7/2003 | Taylor et al. | | 705/21 |
| 2005/0027603 A1 * | 2/2005 | Green | | 705/22 |
| 2007/0007078 A1 * | 1/2007 | Johnson et al. | | 186/61 |
| 2008/0078833 A1 * | 4/2008 | Crockett et al. | | 235/383 |

* cited by examiner

*Primary Examiner* — Mussa A Shaawat
(74) *Attorney, Agent, or Firm* — Holland & Knight, LLP

(57) ABSTRACT

A system and method for enhanced security for a self-checkout system is disclosed where predicted weights of items are used to predict the total order weight. The predicted total order weight is compared to an actual weight of the order based on a weighing of the total order, and an output provided indicating whether the comparison is within acceptable limits or if a security alert or attendant assistance is needed.

9 Claims, 8 Drawing Sheets

SELF-CHECKOUT SECURITY SYSTEM AND METHOD THEREFOR

BACKGROUND OF THE INVENTION

This invention relates to the field of self-checkout systems, and more specifically to a self-checkout security system and method therefor.

Retail self-scanning checkout, also called "self-checkout" (SCO), is an automated system and process that enables customers to scan, bag, and pay for their retail purchases without assistance from checkout attendants. SCO systems allow retailers to reduce the number of checkout attendants, while continuing to provide customers with a satisfactory checkout experience. SCO systems can greatly increase the profitability of a store, because labor costs are significant cost of doing business in most retail operations and reducing the number of checkout attendants reduces labor costs.

A modern self-scanning checkout "kiosk" looks very much like a traditional retail checkout counter except that the customer interacts with a computer's user interface (UI) at a kiosk instead of with a store employee at a traditional checkout counter. A self-checkout unit ("SCO unit") of the prior art generally consists of a user interface (UI) display, computer or other processing device capable of communicating with the retailer's POS computer system and capable of coordinating the functions of the unit, pre-scan area, scanning area, bagging area, scale, pay terminal, coupon handler, and receipt printer. SCO units may include other devices and functions as appropriate for the particular retail application. An example of a SCO unit of the prior art is illustrated in FIG. 1. A SCO system may include one or more SCO units, an Attendant Station, one or more computer systems, a master product database coupled to at least one computer system, a computer network connecting the computer systems, and other retailer Point of Sale (POS) systems, and computer software.

The customer initiates the self checkout process by, for example, touching the computer's welcome screen or, by simply beginning to scan items. Once the checkout process has been initiated, the SCO unit's UI (and optionally, a computer's animated voice) guides the customer through the self-checkout process with step-by-step instructions for how to scan items and where to place them once they have been scanned, guiding the customer through the transaction cumulating in receiving payment from the customer. The SCO units are capable of computing a total price for an order, accepting payment from the customer, and allowing the customer to leave the store without ever requiring the customer to interact with a retail cashier. A SCO system typically includes multiple SCO units grouped together in a retail outlet around a single Attendant Station such that the Attendant can review and assist in transactions at multiple SCO units simultaneously. The Attendant may also provides some degree of store security for SCO transactions.

A SCO system can be integrated with various SCO units and its controlling computer system with the retailer's existing accounting and inventory systems via, for example, a computer network. Mechanisms of communication exist between the SCO unit, the Attendant Station, and the SCO computer system, such as for example, via an Ethernet network. The SCO computer system can also be in communication with the retailer's other computer systems throughout the retail location using similar mechanisms. These communication mechanisms may take any form known to those of ordinary skill in the networking arts, including such mechanisms as coaxial cable, Ethernet, fiber optic cable, and wireless routing, as examples.

A SCO unit may be configured in many different ways to meet the needs of the particular retail outlet. A typical configuration can be found in FIG. 1, which illustrates some common elements of a SCO unit. Acceptable SCO units may include additional, or fewer, components than those described and identified in FIG. 1.

The SCO unit of FIG. 1 includes user interface (UI) 105. A touch screen is one example of an acceptable type of UI 105. Other examples of a user interface include a monitor-type display or scrolling output device. In some configurations, the user interface may include the ability to produce spoken instructions to assist the customer. The customer begins the SCO transaction by interacting with UI 105.

Once a SCO transaction is initiated, a sample check-out process can include UI 105 directing the customer to place items to be purchased, one at a time, from the shopping cart onto unloading area/scale 110. The customer scans each item, placing it first on Scale 110 to be weighted, followed by passing the item over Scanner 125 for Uniform Product Code (UPC) detection. This detection identifies the item to the SCO computer system. A SCO system may use this mechanism, or one of a number of other item detection mechanisms known to those of ordinary skill in the art, to identify the item being purchased. For example, some systems may use a type of Electronic Article Surveillance (EAS) label or similar technology to identify and/or secure particular items in the retail transactions. An EAS label is attached to the item, and causes an alarm when passed through an EAS detection device at the store exit if the label is not first deactivated. Multiple types of EAS labels exist; the three most common types are AM (Acousto-Magnetic), EM (electro-magnetic), and RFID (Radio-Frequency Identification).

To verify the item identification, SCO unit 100 typically obtains the item's expected weight or weights from, for example, a database of known or expected weights of items for sale in the retail location. SCO unit 100 may verify the item's expected weight against the weight measured by Scanner Scale 120. Next, SCO unit 100 instructs the customer to place the item in a bag in bagging area 130. When the bag is full, the customer may be instructed to move the bag to an optional security scale and secondary bagging area 140. When the order is complete, the customer will indicate such to SCO unit 100 using user interface 105. The unit may prompt the customer for coupons at this time. The customer can submit coupons using optional coupon acceptor 180. SCO unit 100 may then total the cost of the order, and displays the amount due. The customer can then tender payment. Payment can be via, for example, a debit/credit module 170, or cash payment using cash acceptor 180, coin acceptor 160, or other similar type of cash, credit or debit module. SCO unit 100 may then provide change using coin dispenser 115, and a receipt may be produced from receipt printer 190.

FIG. 2 illustrates a typical configuration of a SCO system in a retail location. Attendant 200 at Attendant Station 201 may supervise multiple SCO units simultaneously. FIG. 2 illustrates an example configuration of four units (units 210-240). If an SCO unit detects a problem it will notify Attendant 200 to intervene. This notification may take place by Attendant 200 viewing a signal from some kind of optional attendant signaling device, for example, a light on top of SCO unit 100, or a tone may sound, or an indicator on the Attendant Station 201 may be displayed. Any other method of obtaining Attendant 200's attention will also suffice to notify Attendant 200 that a transaction requires intervention. Attendant 200 will then intervene in the transaction, and may use Attendant Station 201 to override or clear an item or transaction, provide the customer with assistance with payment modules, verify customer identification for credit cards or for other retailer purposes, or validate purchases of age-restricted items such as alcohol or cigarettes. Attendant 200 may also override the UPC bar code information, database price information for an item, or perform other intervention necessary to cause the transaction to progress or complete. One Attendant monitoring many SCO units may represent a significant labor cost saving to retailers.

One challenge in present SCO systems is security against misuse of the SCO unit by customers. In a traditional retail checkout system, the checkout attendant, such as Attendant 200, provides some security against theft by customers. However, that person alone may not be sufficient to provide the level of security desired. Attendant 200 can intervene if a SCO unit identifies a problem, including a possible theft. Unfortunately, customers may be able to bypass the SCO unit's security features that detect such mischief or malice. For example, a thief may scan one item, but place two items in the bag in bagging area 130 when Attendant 200's attention is directed elsewhere. Another possible vulnerability exists where the UPC code resides on a removable sticker that the customer may cover or replace with the sticker of a less expensive item, effectively tricking the system into recording the wrong item information. These and other intentional and accidental errors threaten the security of self-checkout systems. Retailers need an automated system to determine if a particular customer's self-checkout order may contain misidentified or untabulated items so that store personnel can inspect the order, without wasting time with random checks or targeted checks which may offend or inconvenience honest customers.

In providing SCO security, items can be individually scanned and placed on a scale one at a time, and are verified individually. With this general approach, substitutions or additional items added can be detected as the items are put on the security scale. This is SCO security based on scanning items and placing them on a scale one at a time so they can be verified individually.

In another mode of self-checkout, the shopper scans items while passing through the store, and bags them in the cart. When finished, the list of items scanned can be made available for the checkout process. But with this self-checkout approach, there is still a need to verify that the shopper did not substitute or add items, because the individual items have will not be individually verified at the SCO lane—they are already in bags in the cart. Some prior art addressed security in this shopping practice by using past history of the shopper, nature of the items scanned, etc., to decide if the shopper should be "audited," that is, whether all of the shopper's items should be rescanned to determine that they were all scanned correctly. This can also be combined with random or systematic checking at the exit, where a store employee examines the receipt and makes a cursory attempt to confirm that it resembles the items in the customer's bags.

One prior system directed to order security is described in U.S. Pat. No. 5,877,485 entitled, "Statistical Sampling Security Methodology for Self-Scanning Checkout System." This patent describes a method for determining how many items store personnel or security guards should hand check in a SCO customer's shopping cart to determine any missing or incorrectly scanned items. This method identifies factors such as customer frequency, queue length, prior history, store location and other factors. This method requires store personnel to check at least some of the items in each customer's cart against a printed transaction record, diluting any labor savings from SCO and delaying the customer's exit from the store, in effect negating any advantage of having used the SCO system.

Another approach uses scales to weight each item purchased, and compares each item's weight and UPC combination to a database of expected item weights. Such comparison ensures that the UPC scanned by the customer matches the expected weight of the item being scanned, and thus prevents the customer from substituting the UPC from one product for another. However, items may have more than one acceptable weight. For example, a product may have a special offer for a limited time, such as "12 oz. More Free!" Also, a product's weight can vary with time, such as a houseplant which is watered during the day. When freshly watered the plant will be heavier, and when dry later in the day it will be lighter. Some items are so light as to have no appreciable weight. These items may be referred to as "zero weight items." For example, a greeting card or gift certificate card may be a zero weight item. Such items degrade order security where security is achieved by means of using item weight alone.

U.S. Pat. No. 5,952,642 entitled, "Method and Apparatus for Detecting Item Substitutions during Entry of an Item into a Self-Service Checkout Terminal" describes a method that attempts to verify when two identical items are scanned in an order and that the weight of the two items should match. A mismatch in the two weights maybe the result of a change in product weight, or an intentional or accidental error by the customer. This patent provides a method to compare identical items to detect possible problems. However, the system of the '642 patent does not teach or describe using multiple correct weights for a single identified item, which may occur in practice, as described above.

U.S. Pat. No. 6,215,078, entitled, "Method and Apparatus for Determining a Stable Weight Measurement for use in a Security Software Application of a Self-Service Checkout Terminal" discusses a method of processing the "weight change control signal" generated by SCO units of the '642 patent, comparing the current item weight value to a previous stable-weight value and generating the weight change control signal only if the current weight is not within a predetermined tolerance range of the previous stable-weight value. As with the '642 patent, described above, this approach requires the user to individually weigh each item in the order, using individual weight to detect item substitution.

Another approach is discussed in U.S. Pat. No. 6,145,629 entitled, "Method and Apparatus for Operating a Self-Service Checkout Terminal which has a Single Weight Scale for Performing Both an Itemization and a Security Function." In this patent, order security was attempted using an unentered-item-detection control signal to indicate that the SCO unit had determined that a customer placed a second item for purchase into the shopping container without having scanned the second item for purchase into the self-service checkout terminal. This approach also requires the user to weigh each item individually instead of using predictive total order weight.

Therefore, a need exists to address the question of how to use SCO to checkout a customer who has already scanned and bagged items during shopping while passing through the store.

BRIEF SUMMARY OF THE INVENTION

Briefly, an embodiment of the present invention uses order security rather than individual item determine if a checkout attendant should be alerted. The total weight of the order can be determined, such as by weighing the loaded cart or by asking the shopper to place the loaded bags together on a scale, or by asking the shopper to place the loaded bags one at a time in a bag well (for EAS deactivation). In such an embodiment of the present invention this total weight can be used to validate the order (e.g., confirming that items were not substituted or added without being scanned), by computing a predicted order weight (e.g., the sum of the predicted individual weights as indicated in the description of the order based on the items scanned during shopping), and comparing the predicted weights to the actual total order weight in order to assess whether the order meets the store's security standards.

DETAILED DESCRIPTION OF THE PREFERRED EMBODIMENTS

The following discussion of embodiments of the present invention illustrates many of the attendant advantages of the embodiments, and shows that various changes may be made in the form, construction and arrangement of the parts without departing from the sprit or scope of the invention, the forms herein above described being merely preferred or exemplary embodiments thereof.

A system embodying the present invention can include a modified SCO unit, as well as software to provide a reasonable basis for computing predicted total order weight to determine order security. In an example embodiment of the present invention, predicted order weight is determined using identification of items scanned into the order and system data regarding the known weight or weights for most or all of the items in a given order. The software can operate alone or in combination within a modified Self Checkout System, as described herein, to provide enhanced order security.

The concept of using total order weight to provide order security is not intuitive and raises numerous questions of feasibility. One challenge is the expectation that the difference between the predicted total order weight and the actual total order weight of a transaction would increase with increasingly larger orders, increasing the error threshold to the point where the resulting system is so tolerant for large orders as to be ineffective at providing effective order security. Another challenge involves the method of obtaining the actual weight of the order without inconvenience to the customer, particularly when the customer scans items as they are selected from the store shelves using a portable POS (PPOS) scanner. A third challenge involves the impact on total order weight of items which are a no appreciable weight, for example, a greeting card. These, and other challenges, are overcome by the method and system of the present invention such as to make using predicted total order weight a preferred method of determining order security.

Figure 1:
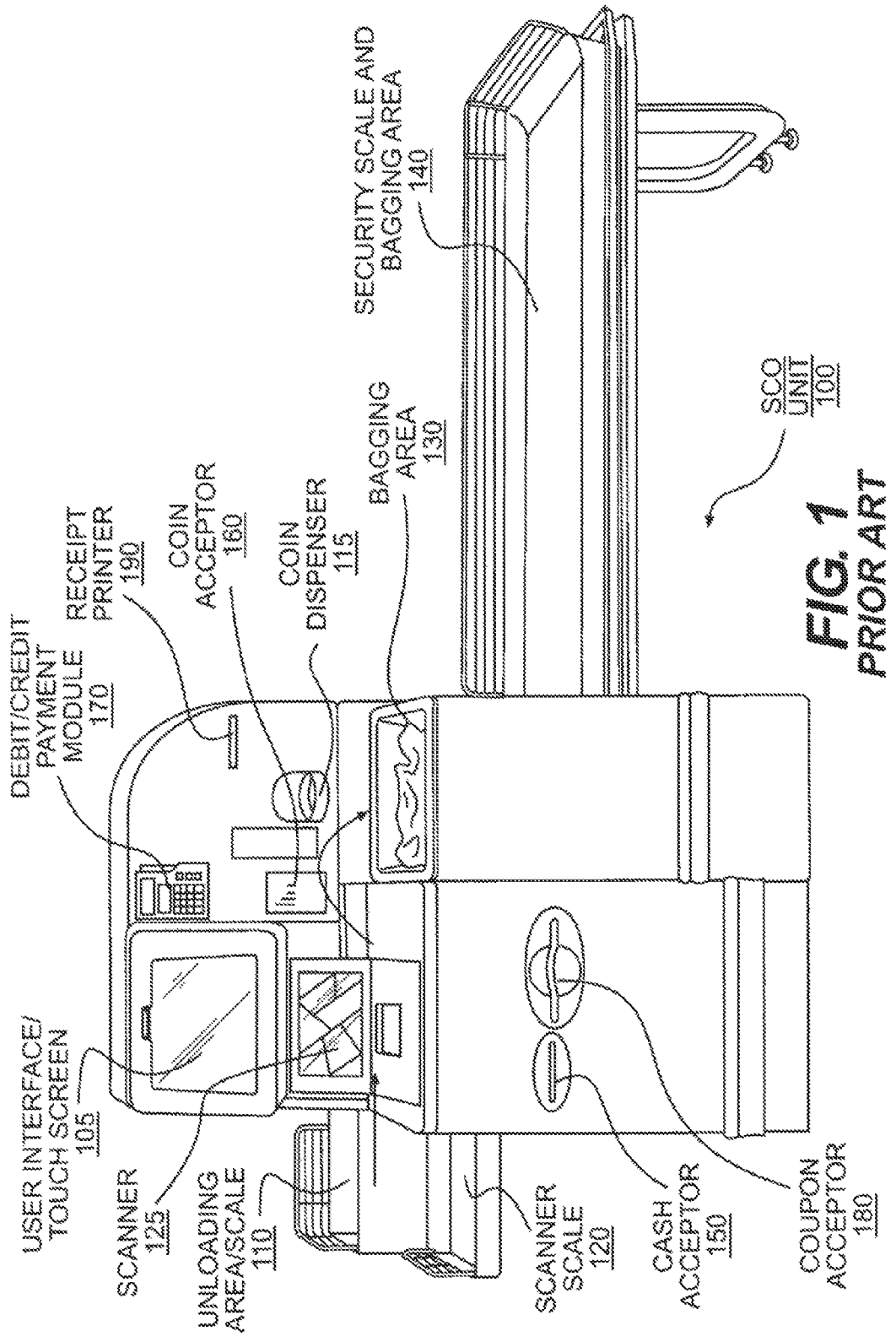
FIG. 1 illustrates a front view of a self checkout unit of the prior art.
Figure 2:
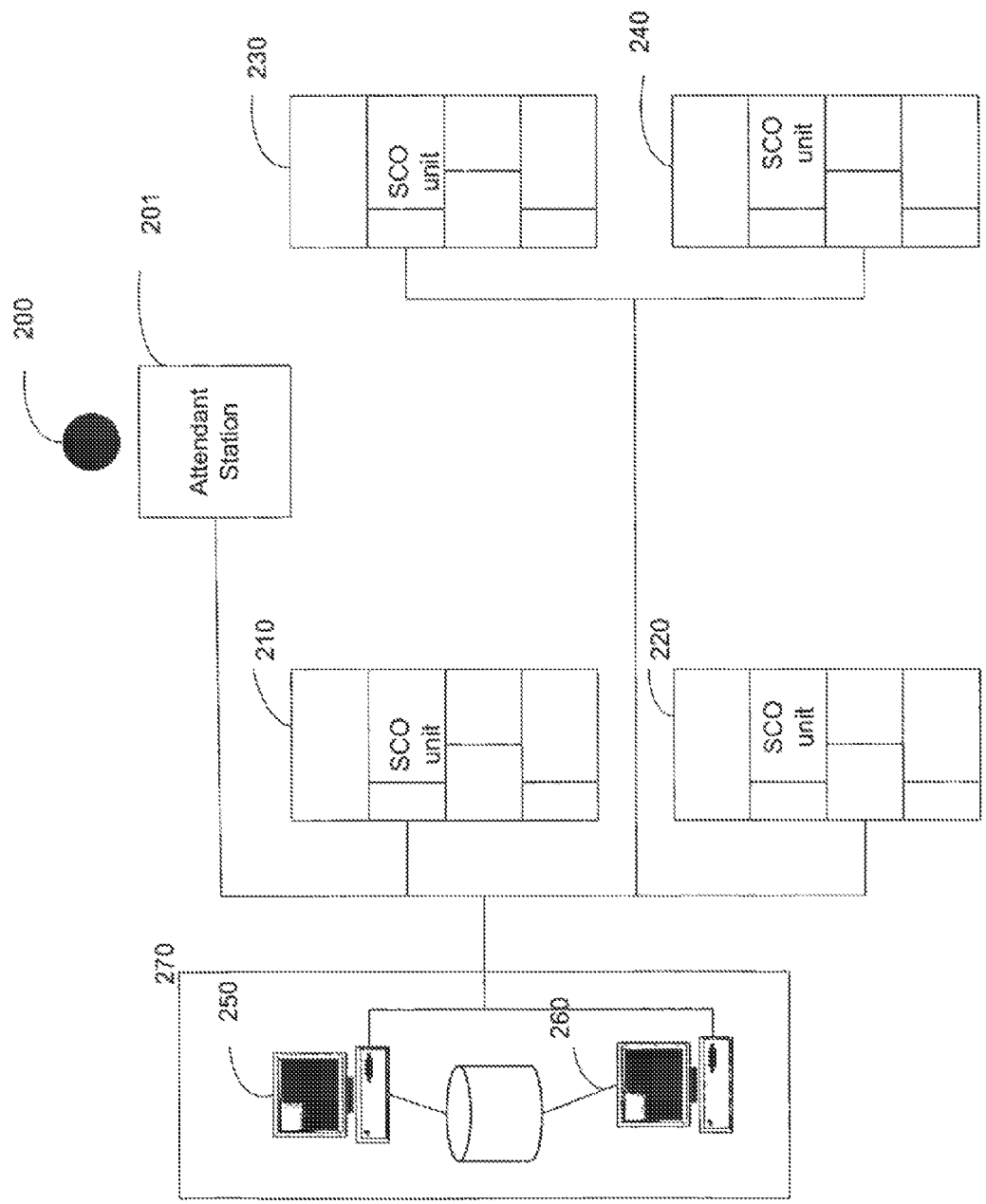
FIG. 2 illustrates a top view of a typical retail configuration for a self checkout system of the prior art.
Figure 3:
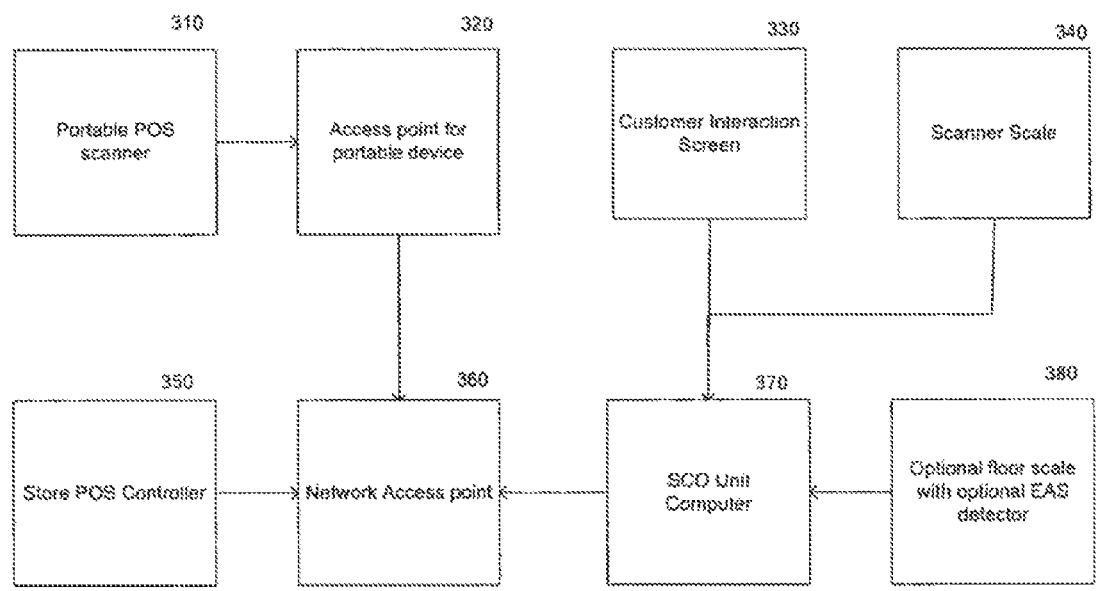
FIG. 3 is an overall high level block diagram of the system of one or more embodiments of the present invention

The system block diagram of FIG. 3 illustrates certain elements of an embodiment of the present invention. The system comprises SCO unit computer 370, which may access or contain a database or other type of data store of item weights, and which communicates with Customer Interaction Screen 330. One illustrative example of a computer is an Intel Pentium 4 microprocessor board such as Part No. WR-1846 available from Ciara Technologies, 9300 Transcanadienne Hwy., Ville St. Laurent, QC H4S 1K5. An illustrative example of a Screen 330 is a touch screen available from Elo Touchsystems, Inc., P.O. Box 1029240, Atlanta Ga. 30368-2924. The Screen 330 is just one example mechanism for communicating instructions to a customer. SCO unit computer 370 may also communicate with Scanner Scale 340 for weighing items to be purchased, or in some embodiments may weight entire bags of items to be purchased. An illustrative example of a Scanner Scale 340 is an NG2 Weigh Bar Kit Model 2020 available from RL Scales Inc., 440 19$^{th}$ Ave Ste 232, Lachine QC H8S 3S2; and NCR Scanner Scale Dual RS232 available from NCR Corporation, P.O. Box 425, Charlotte, N.C. 28275-5245. In some embodiments of the present invention, a hand scanner can be employed, such as a Symbol Hand Scanner (SYM-LS40740400 available form Bluestar Inc., P.O. Box 425, Florence, Ky. 41022-0425. SCO unit computer 370 may be configured with access to Optional Floor Scale with Optional EAS detector 380. Floor Scale 380 may be used for weighing an entire cart, identifying a given cart to determine cart weight, and optionally being able to deactivate EAS tags on purchased merchandise where applicable. SCO unit computer 370, Screen 330, Scanner 340 and Floor Scale 380 are illustrative elements of an exemplary SCO unit as referenced herein.

In the exemplary embodiment of FIG. 3, SCO unit computer 370 can communicate with the retail Store's Point of Sale Controller 350 via Network Access Point 360; which can comprise, for example the network interface on the computer unit 370. Store POS Controller 350 may be implemented on a retailer's existing POS system for accounting and inventory control or on a system with access to those retail functions. Store POS Controller 350 can include, for example, a database of item weights and other information for items available at the retail location. Network Access Point 360 may be any type of network access point. Such an access point commonly allows SCO unit computer 370 to communicate with other computers, and utilizes technoloy such as Ethernet, fiber optic, wireless access, Bluetooth, or any other such technology well known to those of skill in the computer networking art. Network Access Point 360 may also be capable of communicating with portable POS scanner 310. This communication link permits POS scanner 310 to communicate and/or record a customer order on Store POS Controller 350, or directly to SCO unit computer 370 as desired.

The system configuration illustrated in FIG. 3 is only one example of the elements in an embodiment of the present invention. However, one of ordinary skill in the art will appreciate that various components may be substituted, replaced, or removed without impacting the ability of the system of the present invention to perform its stated objectives.

In accordance with an embodiemnt of the present invention, there may be some modifications to a SCO system, including, for example, modifications to the SCO unit. One of ordinary skill in the art will acknowledge that various SCO unit embodiments, some of which are described herein, may be used in accordance with the self-checkout security system and method of the present invention. The following describes a number of exemplary methods contemplated by the present invention to compute and utilize predicted total order weight, as well as to assist in or provide EAS deactivation. Variations on the system and method of the present invention may be contemplated, and will be anticipated by those of ordinary skill in the art, but are not described in detail herein. The following examples are for illustrative purposes only, and not intended to limit the present invention to the discussed illustrative embodiments.

Figure 4:
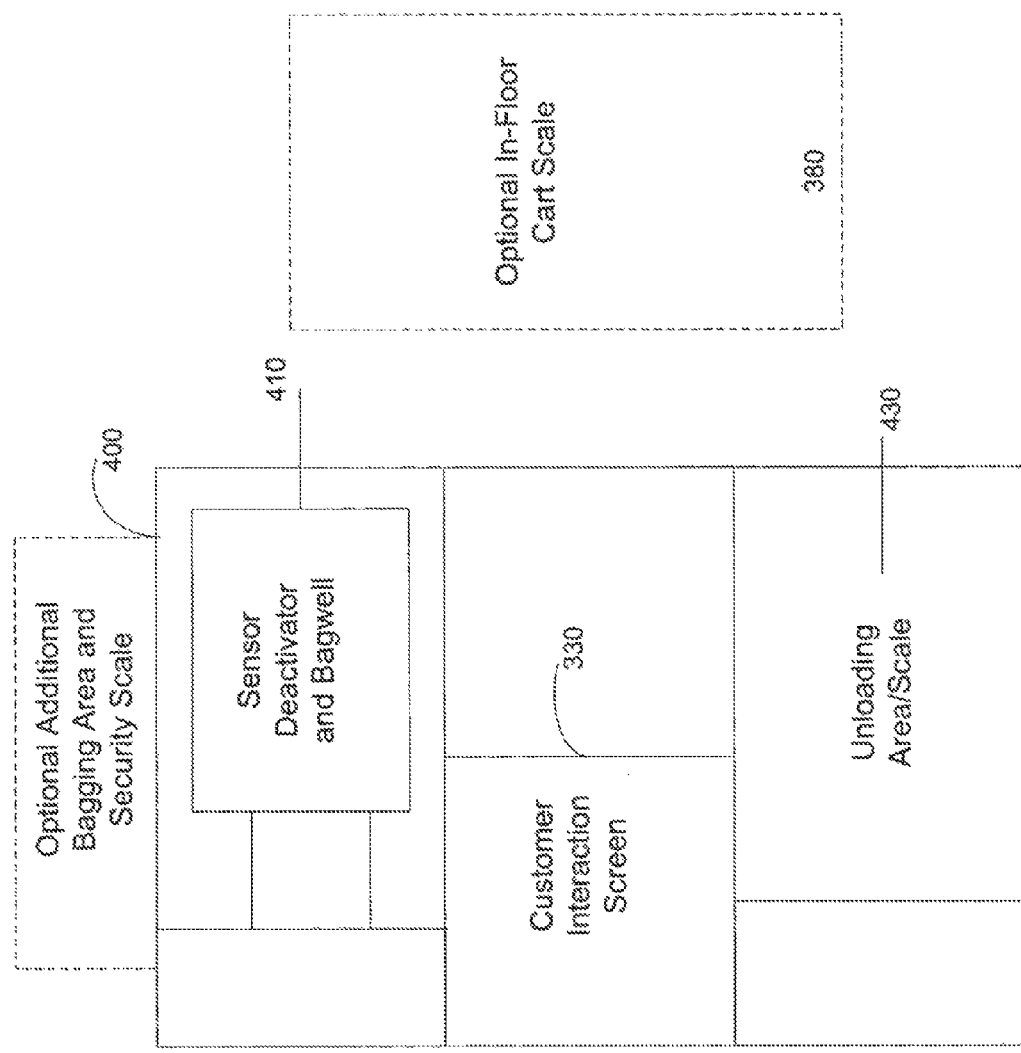
FIG. 4 illustrates a top view of a modified self checkout unit in one or more embodiments of the present invention.

FIG. 4 illustrates one embodiment of a modified SCO unit that can embody the present invention. Modified SCO unit 400 can include a user interface (Customer Interaction Screen 330) and an unloading area and scale 430. SCO unit 400 may also include various options for EAS (or other security device) deactivation. In FIG. 4, bag well 410 illustrates one option for including EAS deactivation, placing one or more deactivators in the bag well of an SCO unit. Floor scale 380 may also be surrounded on one or more sides by a Sensormatic-type deactivation device that could effectively deactivate any magnetic security tags residing on any of the products in any of the shopping bags.

Other embodiments may use alternative configurations, such as an EAS deactivation belt attached, or other options configurable to SCO unit 400. In one embodiment, a customer may scan items to purchase with a mobile scanner, and then place the items directly into bags in the shopping cart while shopping. When reaching modified SCO unit 400, the customer would take each bag out of his/her shopping cart and place the bags, one at a time, in sensor deactivator and bag well 410, which would automatically deactivate any EAS tags for all items in the bag. Alternatively, SCO unit 400 may have a product checkout conveyor belt or other weighing and deactivation element of SCO unit 400. In the case of a conveyor belt, it is preferred for customer use that the belt appear and behave in a manner similar to a belt in typical cashier operated supermarket checkout stations. However, the belt in the modified SCO unit of one or more embodiments of the system of the present invention may have the capability to deactivate EAS tags by using a belt system to pull the bags through an EAS deactivation field. The belt system can also include a scale, which may provide total order weight. The bag well of many existing SCO systems is capable of providing bag weight to the system via a scale in the base of the bag well. The system then, in turn, may provide bag weight to be used in computing actual total order weight in accordance with embodiments of the present invention.

Alternative modifications to existing SCO units and systems may achieve the same ends with less expense and are also contemplated as possible embodiments of the present invention. For example, for customers using the hand-held scanner system described above, the EAS tag detection system may be disabled using a timer or other option when that customer exists the store, preventing the EAS tags, while still active, from setting off an alarm. While this embodiment may be relatively low costs and quick to implement using existing SCO systems, its drawbacks include reducing overall security in the system by deactivating for more than one customer at a time, creating tag pollution, and overall creating a security flaw in the system which might be exploited by thieves and untrustworthy employees.

Figure 5:
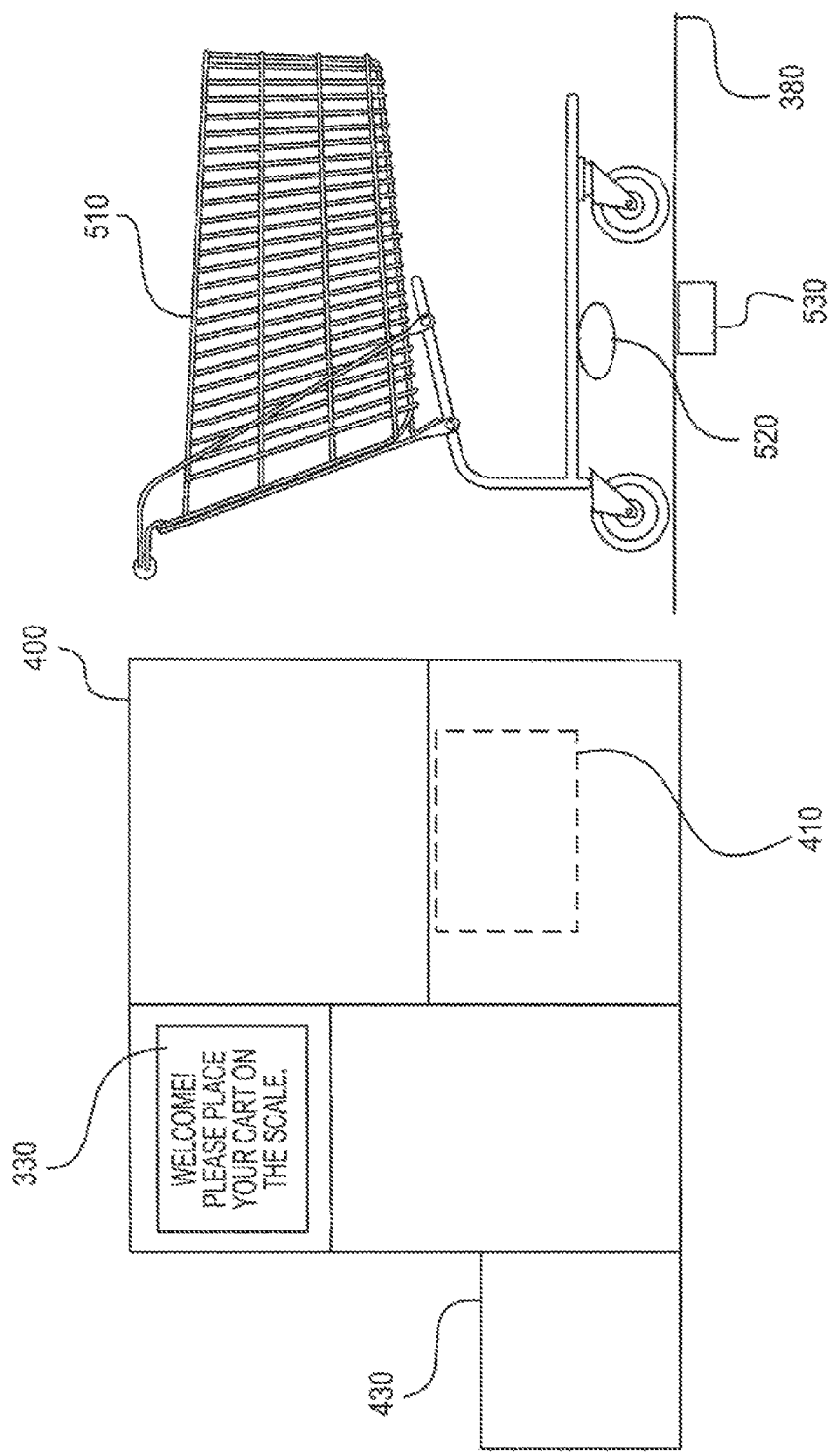
FIG. 5 illustrates a side view of a typical configuration for a self checkout system with a shopping cart scale in one or more embodiments of the present invention.

FIG. 5 shows another view of the system described above in FIG. 4. Modified SCO unit 400 may include a scale capable of weighing the entire shopping cart that contains the customer's order. The customer would roll shopping cart 510 onto floor scale 380, and total "order plus cart" weight would be measured. The total actual order weight would be computed by subtracting the weight of the cart from the total "order plus cart weight." Total actual order weight would then be compared to the computed predicted order weight, as described herein, and order security would be determined using the difference, if any, between the actual order weight and the computed predicted order weight.

The above described "cart weight" embodiment may be used as a primary means of order security, as an audit option, or may be used to confirm predictive weight obtained on each order. This embodiment offers increased deterrent to theft, as some methods of circumventing the existing SCO unit security are eliminated when the entire cart is weighted. For example, a customer who scans one item, but places two in the bag, stands a greater chance of being caught when the entire cart is weighted. Also, the visibility of the security of this embodiment creates a greater deterrent effect than some other embodiments of the present invention.

Cart weight may be determined by default, if the retailer has only one type of shopping cart. Alternatively, the "cart type" may be detected by any suitable detector known to the those of skill in the art, based on an identifier on, part of, or in the structure of the cart. "Cart type" can be used to obtain an assumed weight from the system for that type of cart, and that weight subtracted from the measured weight of the cart with the order in it, to obtain actual total order weight. A preferred embodiment determines the cart weight by placing individual identifiers on each shopping cart that can be detected by the SCO system to self-identify the particular shopping cart. Cart identifier 520 may be located anywhere on the cart, such as for example, it can be located on the bottom of shopping cart 510 and detected by cart detector 530, located in or near floor scale 380, to self-identify cart 510 to the SCO system. Individual cart identification allows reference to a previously determined, for example, measured weight of a cart. Where cart identifier 520 is an EAS device, cart detector 530 may deactivate the device to allow the cart to leave the store without triggering an alarm. Alternatively, various methods well known to those of ordinary skill in the art, such as RFID or bar codes, may be used to identify individual carts. Individual cart weight may be store in a cart weight database on Store POS Controller 350, or another computer or device of the system of the present invention. In this way, the weight of the individual cart is known, greatly reducing the error when the cart's weight is subtracted from the total weight to determine actual order weight.

Alternative embodiments of the present invention include those where the customer wheels a cart up to one side of the SCO unit and scans each item to be purchased, placing the items in a second shopping cart or basket on the opposite side of the SCO unit which is already sitting empty on a weighing platform. This embodiment allows the shopping cart or basket to be weighed when empty, eliminating the need to identify the cart to the system to determine the cart weight.

Figure 6:
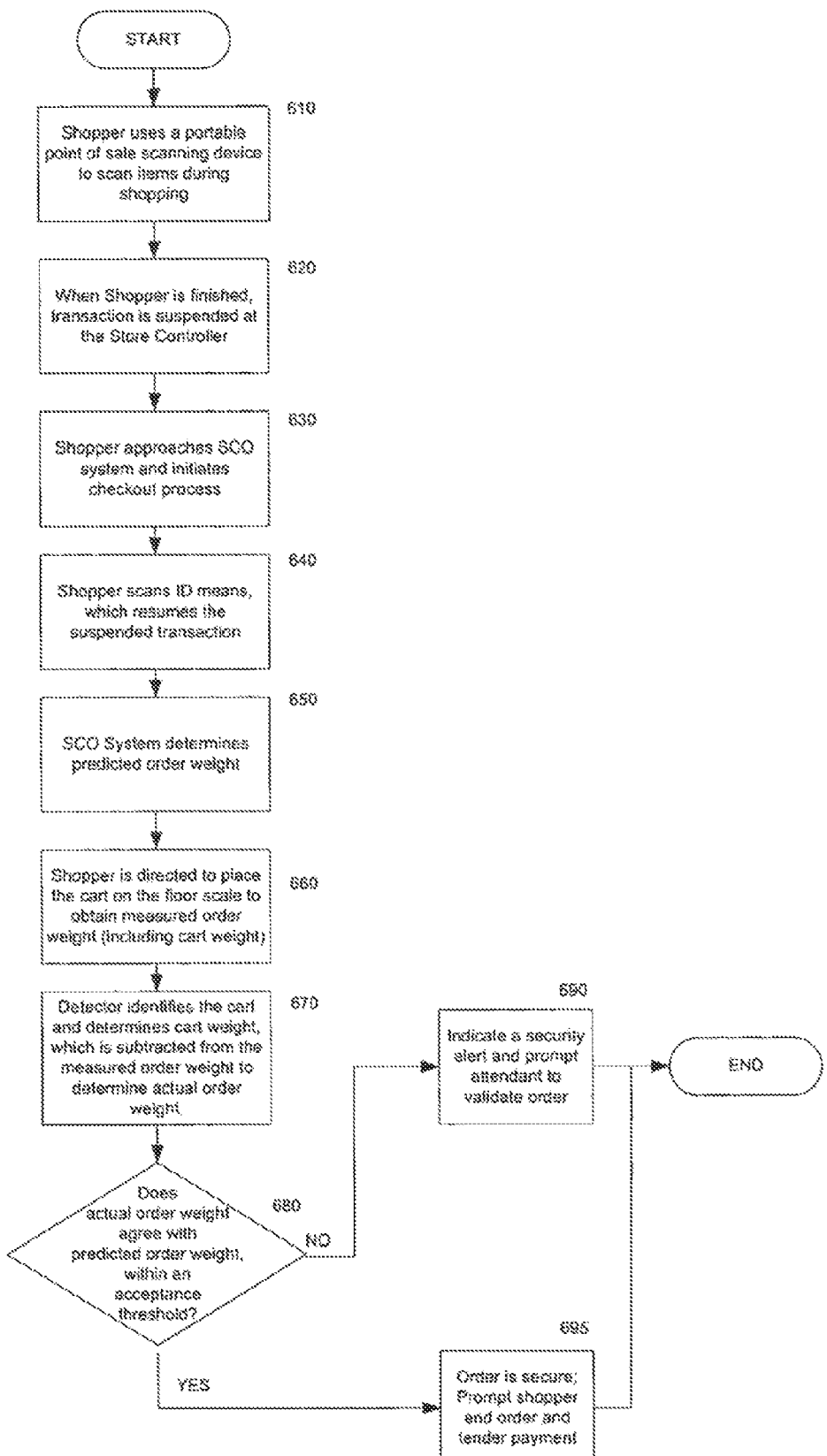
FIG. 6 illustrates an example process flow of a customer using a portable scanning device and an SCO unit of one or more embodiment of the present invention.

The process of creating, totaling and concluding an order in one or more embodiments of the present invention may follow the example shown in FIG. 6. First, at step 610 a customer begins the order. In one or more embodiments, the customer may use a portable point of sale (PPOS) scanning device to scan items as they are selected, but this option is not a requirement of the SCO system of the present invention. The PPOS scanning device may be one of any type of device available, including a hand held scanner, a cart mounted scanner, or other device appropriate for use by a customer while shopping in a retail establishment. When using the PPOS scanner, the customer scans each item as it is selected from the shelf, then puts the item into the shopping cart or basket.

The customer proceeds to select all the items desired, scanning and placing each in the shopping cart or basket. At step 620, when the order is complete the customer can indicate such using the PPOS device. This indication is communicated to the Store controller POS 350, shown in FIG. 3. Store controller 350 then suspends the transaction pending checkout. At step 630, the customer approaches a SCO unit and initiates the check out process. At step 640, the customer identifies the order to the SCO unit. This identification may comprise interaction between the Customer and SCO unit using Customer Interaction Screen face 330, or using any available method of identification contemplated by retail outlets to identify their customers. For example, the customer may swipe a credit card, a "loyalty," or a "frequent buyer" card at the SCO unit. In another embodiment of the invention, the SCO unit may automatically detect an approaching customer using an identifier associated with the shopping cart or basket. Alternatively, the PPOS may identify itself to the SCO unit. Whatever the method of identifying the order to the SCO unit is used, the suspended transaction is retrieved, and the predicted order weight is computed, as described in FIG. 7.

At step 660, the SCO unit directs the customer to place the cart or basket on the weighing scale. The weighing scale may take the form of a floor scale, such as floor scale 380, in one or more embodiments of the present invention. Alternatively, in some retail locations a basket scale may be provided with the SCO unit itself. At step 670, the SCO unit determines the actual weight of the order, including the weight of the shopping cart or basket, by obtaining the actual weight from scale 380. EAS detector 530 may then identify the shopping cart or basket, and remove its actual empty weight from the measured weight of the order. The system of the present invention then compares the predicted and actual order weights at step 680. Based on the comparison, the system provides an output indicator. For example, if the weights are in agreement, within a tolerance determined by the retail established based on its type of customers, products, and other appropriate factors, modified SCO unit 400 may then prompts the customer to tender payment at step 695. Or if the weights are not in agreement within the established tolerance, then the system can output a security alert or prompt the attendant for attention at step 690.

The present invention may be employed to compute a predicted total order weight for the order, which provides enhanced order security over prior art methods. This predicted weight may be compared to the actual order weight to provide enhanced order security for the SCO system. The following provides an overview of the process used in accordance with an embodiment of the present invention to predict the weight of the total order as indicated in step 650. Predicting order weight, and comparing that weight to actual order weight, may provide added order security to SCO systems.

Figure 7:
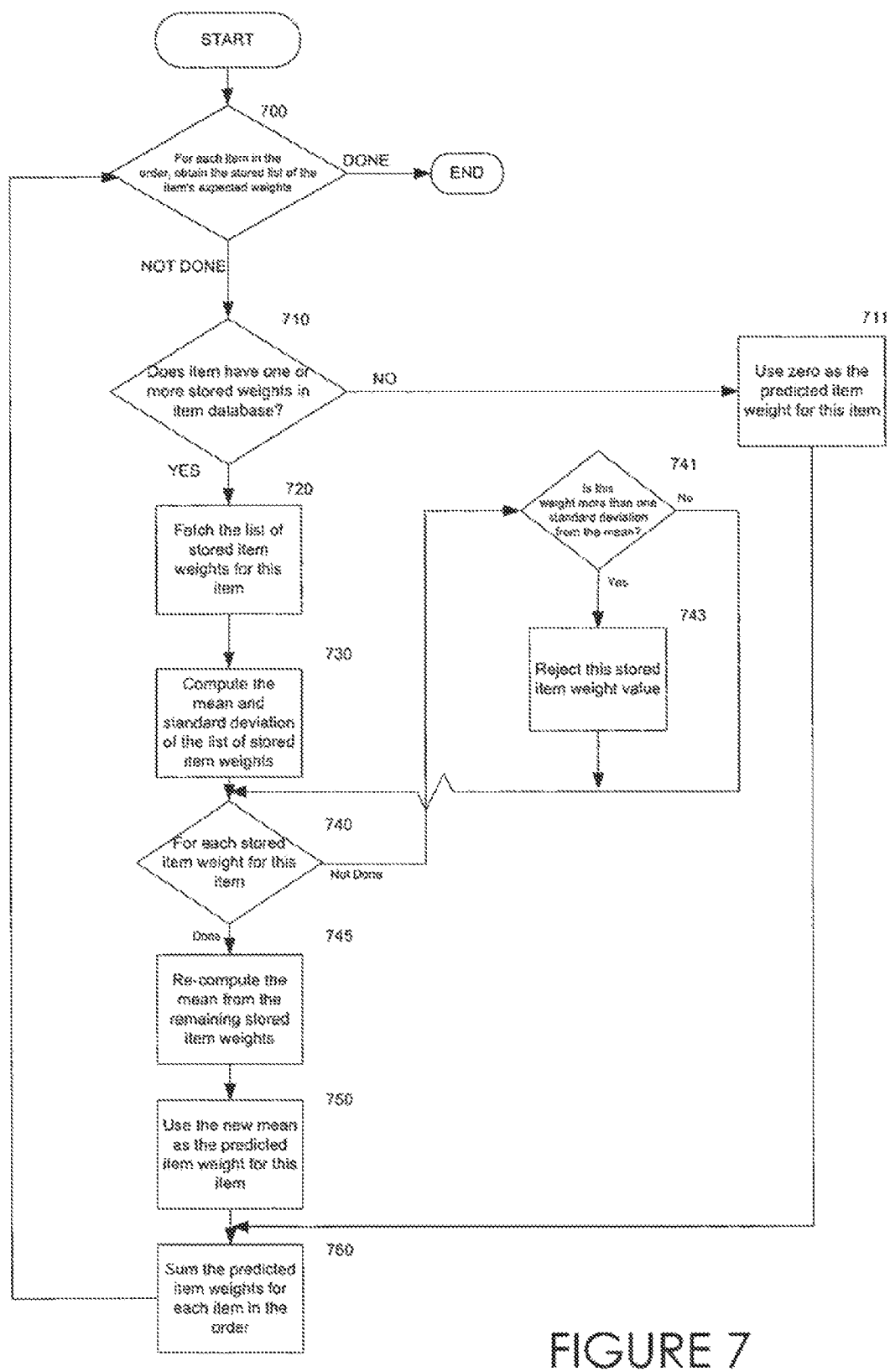
FIG. 7 illustrates an example process flow for predicting total order weight in one or more embodiments of the present invention.

FIG. 7 illustrates an exemplary process for computing a predicted total order weight in accordance with an embodiment of the present invention. At step 700, item weight data such as, for example, a list of weights associated with the identified item is obtained from, for example, the system's product weight database, or other convenient location as will be recognized by those of ordinary skill in the art. Preferably the list should include sufficient expected weights for items so as to be statistically relevant. In one embodiment of the present invention, an initial list of 24 expected weights was utilized.

If the system fails to obtain at least one weight for the item, which is tested at step 710, then a negligible weight, such as 0.0 is used for that item (step 711) and the process skips ahead to step 760. Alternatively, when weights are not found, it is preferred that the sum of such weights assigned in step 711 be negligible. As those skilled in the art will recognize, there are many ways of achieving this sum; always using 0.0 is one way, alternating assigning similar positive and negative weights is another.

If a weight is obtained, then at step 730 the mean and standard deviation for the weights in the list are computed. At steps 740-743, the stored weights in the list are tested to see if they are more than one (1) standard deviation from the current mean of the list. If an entry in the list is more than one (1) standard deviation from the mean, then that entry is rejected at step 743, and at step 745 the mean for the remaining weight readings is recomputed and used to predict the item weight ("predicted item weight.") If the reading is not rejected, then at step 750 the new mean is used to compute predicted item weight. Finally, at step 760 all predicted item weights are summed to determine predicted total order weight.

Prior to testing this exemplary method in a self-checkout system with scales, control electronics, belts and customer interfaces, the data from approximately 29,657 existing checkout logs was analyzed. The breakdown of transactions was studied and produced the following observations. For 3,761 transactions, or 13% there was a security override (8% security override only, plus 5% security override and items with missing weight records). For 21,922 transactions, or 74%, weight records were available for all items in the transaction, and no security overrides were present. Applying the process described above, the predicted and actual order weights were compared. This comparison provided two observations. First, the difference between predicted and actual total order weight does not increase with total order weight; if anything it may decrease. Second, the acceptance threshold for order-weight security can be acceptably low: a threshold of 0.5 pounds would yield an acceptance rate for this data of 97%, while a threshold of 0.3 pounds would yield an acceptance rate of 95%.

5,336 transactions, or 18%, contained at least one item for which no weight record was available. This includes new items that had not passed through the SCO system yet, and items of variable weights such as flowers for which the SCO system does not track weight data. For example, a flower pot that has been watered recently has a significantly different weight than the same flower pot later in the day.

Based on a review of the sample transactions, it appeared that the difference between predicted and actual weight does not increase with total order weight for most transactions. And, the acceptance threshold for order-weight security must be significantly higher than for transactions where weight data is available for all items. To achieve 80% acceptance of these transactions, the threshold must be 2.5 pounds; using the 0.3-pound tolerance applicable to transactions where all items have weight data, the acceptance rate falls to 24%.

The particular sample transaction data observed indicated that the average actual weight of an item for which there was no weight record in this data was 1.28 pounds. If this assumed weight is used with the sample data instead of a weight of zero (0) as described above, the acceptance rate for transactions treated this way fell from 24% to only 20% acceptance at the three-tenths of a pound (0.3-pound) tolerance threshold. One challenge to computing predicted total order weight is handling items without an expected weight recorded by the system. In one or more embodiments of the present invention, self-checkout orders may be divided into two categories:

those for which weight records are available for all items in the order, and those for which weight records are unavailable for one or more items. The weight of most of the items in a self-checkout system will be available to the SCO unit through, for example, the system's database of weights and U.P.C. codes for items previously introduced to the system. For other items, however, there will not be data indicating an expected weight. This category will include new items, items having a variable weight, and items which are not "weight required", such as magazines, flowers, produce sold by quantity, bakery items, as well as items of no appreciable weight, such as gift cards and greeting cards. For transactions where weight records are available for all items, an acceptance threshold of three tenths (0.3) of a pound difference between predicted and actual order weight is preferred in a embodiment of the present invention. For transactions where weight records are unavailable for one or more items, an acceptance threshold of two and one half (2.5) pounds difference between predicted and actual order weight is preferred in an embodiment of the present invention.

Once a theft or customer error has been detected, one or more methods to alert the Attendant to a possible security violation may include various sight and sound alarms. For example, paging tones can be created and emitted by the SCO unit, colored lights (possibly encoded as green, yellow, and red lights) could be used to notify the Attendant of the status of the order, where green could represent an order with actual total order weight very close to predicted total order weight, yellow could represent orders where actual total order weight is just outside the predicted total order weight, and red might represent orders where actual total order weight is definitely outside the predicted total order weight. Colored lights may be located above the payment station, on handheld device, or resident on an Attendant Station. The limits to trigger each scenario may be customized to a given retailer, as would the Attendant's proscribed response to any given indicator.

For transactions not approved automatically, the following possibilities may be applied. First, the Attendant may be prompted to override or verify the transaction, and the prompt may indicate the weight difference. The Attendant may judge if the difference is large enough to require additional verification. If the Attendant judges that additional verification is not needed, then overriding the alert may allow the customer to proceed immediately to tender. Second, for transactions with items with unavailable weight records, the Attendant may identify the items to the system. For example, if the difference is ten (10) pounds, and the item with the missing weight record is a ten (10) pound bag of flour, the Attendant can with confidence override the transaction. Third, a verification process may be created in which the Attendant may select items from the customer's bags (such as CDs or cosmetics) and scan them, and the modified SCO system may confirm that these items are properly recorded in the transaction. If so, the order would be approved; if not, an error on the part of the customer has been discovered.

A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer system to read such computer readable information.

Figure 8:
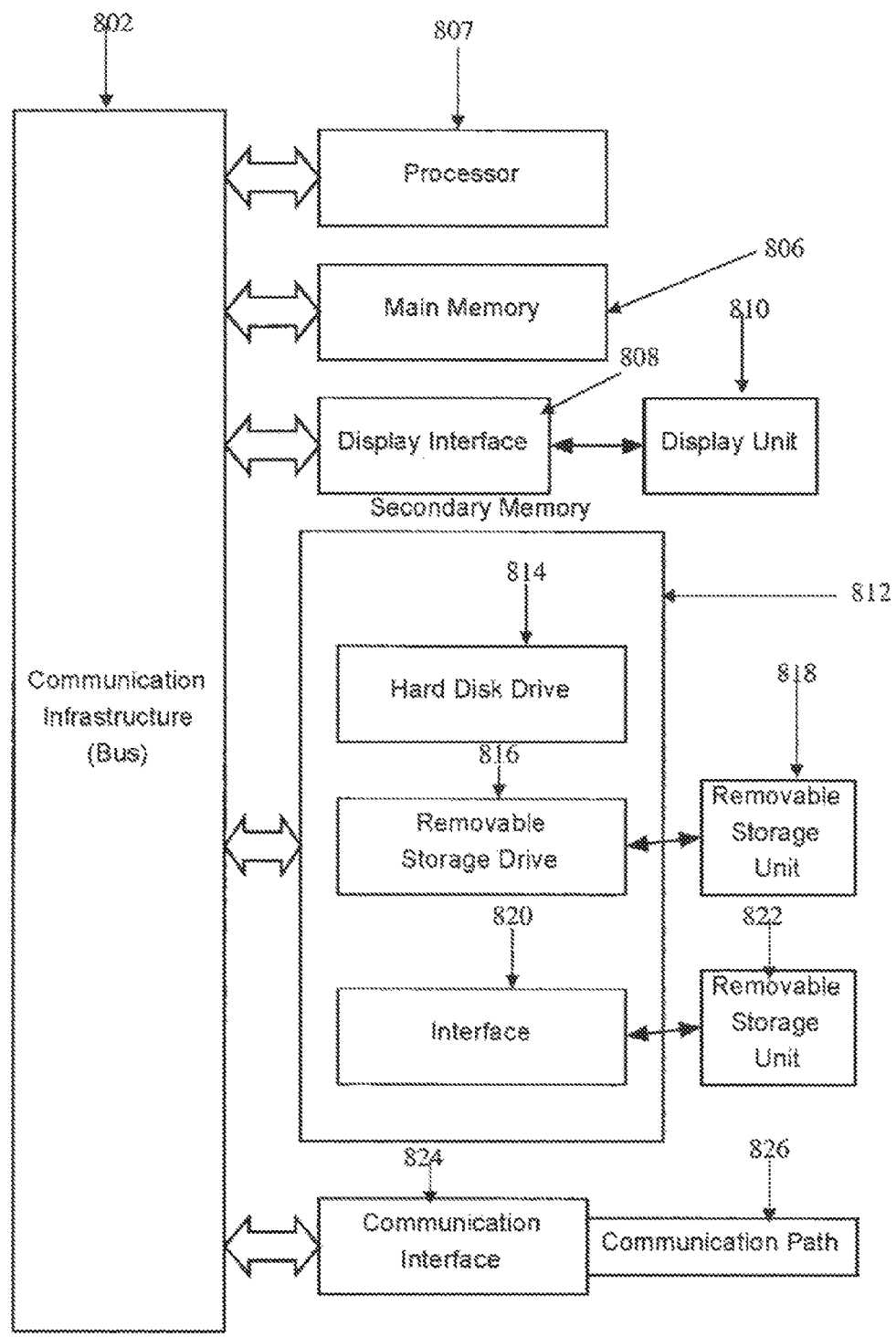
FIG. 8 is a high level block diagram of an information processing system useful for implementing one or more embodiments of the present invention.

FIG. 8 is a high level block diagram showing an information processing system useful for implementing one embodiment of the present invention. The computer system includes one or more processors, such as processor 804. The processor 804 is connected to a communication infrastructure 802 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 808 that forwards graphics, text, and other data from the communication infrastructure 802 (or from a frame buffer not shown) for display on the display unit 810. The computer system also includes a main memory 806, preferably random access memory (RAM), and may also include a secondary memory 812. The secondary memory 812 may include, for example, a hard disk drive 814 and/or a removable storage drive 816, representing a floppy disk drive, a magnetic tape drive, an optical disk drive, etc. The removable storage drive 816 reads from and/or writes to a removable storage unit 818 in a manner well known to those having ordinary skill in the art. Removable storage unit 818, represents a floppy disk, a compact disc, magnetic tape, optical disk, etc. which is read by and written to by removable storage drive 816. As will be appreciated, the removable storage unit 818 includes a computer readable medium having stored therein computer software and/or data.

In alternative embodiments, the secondary memory 812 may include other similar memory for allowing computer programs or other instructions to be loaded into the computer system. Such memory may include, for example, a removable storage unit 822 and an interface 820. Examples of such may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to the computer system.

The computer system may also include a communications interface 824. Communications interface 824 allows software and data to be transferred between the computer system and external devices. Examples of communications interface 824 may include a modem, a network interface (such as an Ethernet card), a communications port, a PCMCIA slot and card, etc. Software and data transferred via communications interface 824 are in the form of signals which may be, for example, electronic, electromagnetic, optical, or other signals capable of being received by communications interface 824. These signals are provided to communications interface 824 via a communications path (i.e., channel) 826. This channel 826 carries signals and may be implemented using wire or cable, fiber optics, a phone line, a cellular phone link, an RF link, and/or other communications channels.

Computer programs (also called computer control logic) are stored in main memory 806 and/or secondary memory 812. Computer programs may also be received via communications interface 824. For example, the computer programs, when executed, enable the processor 804 to perform the features of the computer system.

What has been shown and discussed is a simplified depiction of a programmable computer apparatus. Those skilled in the art will appreciate that other low-level components and connections are required in any practical application of a computer apparatus. The invention described herein may be implemented using such a programmable computer apparatus, as it broadly relates to the field of methods and systems for processing transactions in a self-checkout system, and more specifically, to a method and system for computing predictive weights of orders in a self-checkout system.

It will be understood by those skilled in the art that the above exemplary embodiments of the present invention is not intended to limit the spirit and scope of the invention. Insofar as those changes and modifications are within the purview of the appended claims, they are to be considered as part of the present invention.

What is claimed:

1. A self-checkout security system for verifying a total weight of a plurality of items in a container, comprising:
   a weighing unit that measures the total weight of the plurality of the items in the container;
   a memory storing a list of identification data, including at least a first set of identification data respectively associated with corresponding ones of a first set of items in the container;
   a storage unit that stores weight data associated with the first set of identification data; and
   a processing unit communicatively coupled with the weighing unit and the storage unit to compare a predicted weight of the plurality of the items identified in the list to the total weight of the plurality of items in the container, wherein the processing unit is configured to process each of the identification data from the list including:
      receive from the storage unit the weight data associated with the first set of identification data;
      compute a mean and a standard deviation for the weight data associated with the first set of identification data;
      reject from the weight data associated with the first set of identification data, weight data that is more than the computed standard deviation from the computed mean;
      compute a first predicted weight associated with the first set of identification data as the mean of the weight data associated with the first set of identification data excluding the rejected weight data;
      compute a second predicted weight associated with at least a corresponding one of a second set of items in the container not having weight data in the storage unit, using a negligible weight as a weight for the at least a corresponding one of the second set of items in the container;
      compute the predicted weight of the plurality of the items in the container as a sum of the computed first and second predicted weights;
      comparing the computed predicted weight and the total weight and providing a signal responsive to the comparing; and
   an indicator coupled to the processing unit so as to be responsive to the signal.

2. The system of claim 1, wherein the weight scale is constructed and arranged to weigh one of the items in the container at a time.

3. The system of claim 1, wherein the weight scale is constructed and arranged to weigh a bag of the items in the container of the order at a time.

4. The system of claim 1, wherein the weight scale is constructed and arranged to weigh all of the items in the container at the same time.

5. The system of claim 1, further comprising a deactivator constructed and arranged to automatically deactivating a theft deterrent device attached to the at least one item in the container.

6. The system of claim 5, wherein the theft deterrent device is an Electronic Article Surveillance tag.

7. A method of verifying a total weight of a plurality of items that have been scanned and loaded in a container for a self-checkout security system, comprising:
   providing a list of identification data, including at least a first set of identification data, each of which identifying a corresponding one of the items in the container;
   determining the total weight of the plurality of the items in the container;
   storing weight data associated with the first set of identification data;
   processing each of the first set of identification data by:
      retrieving the weight data associated with a selected one of the first set of identification data; and
      computing a mean and a standard deviation for the weight data associated with the selected one of the first set of identification data and using the computed mean as a first predicted weight associated with the selected one of the first set of identification data;
   processing any identification other than the first set of identification data by:
      computing a second predicted weight of items not having stored weight data using a negligible weight for such items; and
      computing the predicted weight of the plurality of the items in the container as a sum of the computed first and second predicted weights; and
   providing a security signal based on a comparison of the predicted weight of the plurality of the items in the container and the total weight.

8. The method of claim 7, further comprising:
   determining if the result of the comparison is within an acceptance threshold.

9. The method of claim 7, wherein the computing of the means and the standard deviation includes:
   rejecting from the weight data associated with the selected one of the first set of identification data, weight data that is more than the computed standard deviation from the computed mean; and
   computing the first predicted weight associated with the weight data associated with the selected one of the first set of identification data, excluding the rejected weight data.

* * * * *